United States Patent
Wuergler et al.

(10) Patent No.: US 10,289,197 B2
(45) Date of Patent: May 14, 2019

(54) APPARATUS AND METHOD FOR DETECTING INAPPROPRIATE GEAR SELECTION BASED ON GAZE INFORMATION

(71) Applicant: GM GLOBAL TECHNOLOGY OPERATIONS LLC, Detroit, MI (US)

(72) Inventors: Michael A. Wuergler, Clarkston, MI (US); Orson S. Wang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 95 days.

(21) Appl. No.: 15/606,829

(22) Filed: May 26, 2017

(65) Prior Publication Data

US 2018/0341327 A1   Nov. 29, 2018

(51) Int. Cl.
*F16H 61/18* (2006.01)
*G06F 3/01* (2006.01)
*F16H 61/16* (2006.01)
*G06K 9/00* (2006.01)
*B60W 30/00* (2006.01)

(52) U.S. Cl.
CPC ............ *G06F 3/013* (2013.01); *B60W 30/00* (2013.01); *F16H 61/16* (2013.01); *F16H 61/18* (2013.01); *G06K 9/00281* (2013.01)

(58) Field of Classification Search
CPC .... F16H 61/16; F16H 61/18; F16H 2061/163; F16H 2061/185; G06F 3/013; G06K 9/00281
See application file for complete search history.

(56) References Cited

U.S. PATENT DOCUMENTS

2016/0107642 A1*  4/2016  Salgado ............... B60W 50/10
                                                  701/1

* cited by examiner

*Primary Examiner* — Erin D Bishop

(57) ABSTRACT

A method and apparatus for determining whether a shift in gear is appropriate based on a gaze of an operator. The method includes detecting a shift from a first gear to engage a second gear, receiving gaze information associated with the gaze of the user, based on the gaze information, determining whether the second gear is inappropriate, and performing a corrective action corresponding to the inappropriate second gear in response to determining that the second gear is inappropriate.

18 Claims, 2 Drawing Sheets

APPARATUS AND METHOD FOR DETECTING INAPPROPRIATE GEAR SELECTION BASED ON GAZE INFORMATION

INTRODUCTION

Apparatuses and methods consistent with exemplary embodiments relate to gaze tracking and detection. More particularly, apparatuses consistent with exemplary embodiments relate to determining the intent of a user based on gaze information.

SUMMARY

One or more exemplary embodiments provide an apparatus capable of determining whether a change in a gear of a vehicle is intended by an operator of a vehicle or whether the change is inappropriate. More particularly, one or more exemplary embodiments provide an apparatus that is capable of determining whether a change in a gear of a vehicle is intended by an operator of a vehicle or is inappropriate by tracking a gaze of the operator and determining the intent of the operator.

According to an aspect of an exemplary embodiment, a method for detecting an inappropriate gear selection based on a gaze of a user is provided. The method includes detecting a shift from a first gear to engage a second gear, receiving gaze information associated with the gaze of the user, determining whether the second gear is inappropriate based on the gaze information, and performing a corrective action corresponding to the inappropriate second gear to the second gear in response to determining that the second gear is inappropriate.

The gaze information may include information indicating that the user is looking towards a rear of a vehicle, a rear camera display, a rear view mirror, or a side view mirror, and the determining may determine that the second gear is inappropriate if the second gear is a gear in which a wheel of a vehicle moves forward.

The method may further include applying a brake in response to determining that the second gear is inappropriate.

The gaze information may include information indicating that the user is looking down or at a user device, and the determining may determine that the second gear is inappropriate if the second gear is a gear that causes a vehicle to move.

The method may further include disregarding the shift from the first gear to the second gear in response to determining that the second gear is inappropriate.

The gaze information may include information indicating that the user is looking towards a front windshield, and the determining may determine that the second gear is inappropriate if the second gear is a gear that causes a vehicle to move backwards.

The method may further applying a brake in response to determining that the shift to the second gear is inappropriate.

The method may further include determining whether to shift into a third gear different from the second gear based on the gaze information, and shifting the vehicle into the third gear in response to determining to shift into the third gear based on the gaze information.

The performing the corrective action corresponding to the inappropriate second gear may include notifying the user that the second gear may be inappropriate by outputting at least one from among audible feedback displayed feedback and haptic feedback to the user.

According to an aspect of another exemplary embodiment, an apparatus for detecting an inappropriate gear selection based on a gaze of a user is provided. The apparatus includes at least one memory comprising computer executable instructions and at least one processor configured to read and execute the computer executable instructions. The computer executable instructions cause the at least one processor to detect a shift from a first gear to engage a second gear, receive gaze information associated with the gaze of the user, determine whether the second gear is inappropriate based on the gaze information, and performing a corrective action corresponding to the inappropriate second gear in response to determining that the second gear is inappropriate.

The gaze information may include information indicating that the user is looking towards a rear of a vehicle, a rear camera display, a rear view mirror, or a side view mirror, and the computer executable instructions may further cause the at least one processor to determine that the second gear is inappropriate if the second gear is a gear in which a wheel of a vehicle moves forward.

The computer executable instructions may also further cause the at least one processor to control to apply a brake in response to determining that the second gear is inappropriate.

The gaze information may include information indicating that the user is looking down or at a user device, and the computer executable instructions may further cause the at least one processor to determine that the second gear is inappropriate if the second gear is a gear which causes a vehicle to move.

The computer executable instructions may also further cause the at least one processor to control to disregard the shift from the first gear to the second gear in response to determining that the second gear is inappropriate.

The gaze information may include information indicating that the user is looking towards a front windshield, and the computer executable instructions may further cause the at least one processor to determine that the second gear is inappropriate if the second gear is a gear which causes a vehicle to move backwards.

The computer executable instructions may also further cause the at least one processor to control to apply a brake in response to determining that the second gear is inappropriate.

The computer executable instructions may further cause the at least one processor to determine whether to shift to a third gear different from the second gear based on the gaze information and shift the vehicle into the third gear in response to determining to shift into the third gear based on the gaze information.

The computer executable instructions may further cause the at least one processor to perform the corrective action corresponding to the inappropriate second gear by notifying the user that the second gear may be inappropriate by outputting at least one from among audible feedback displayed feedback and haptic feedback to the user.

The historical gaze information may include at least one from among an action of the user, visual information location, target name, gaze location, dwell time on target, number of distinct glances and total dwell time.

Other objects, advantages and novel features of the exemplary embodiments will become more apparent from the following detailed description of exemplary embodiments and the accompanying drawings.

DETAILED DESCRIPTION

Figure 1:
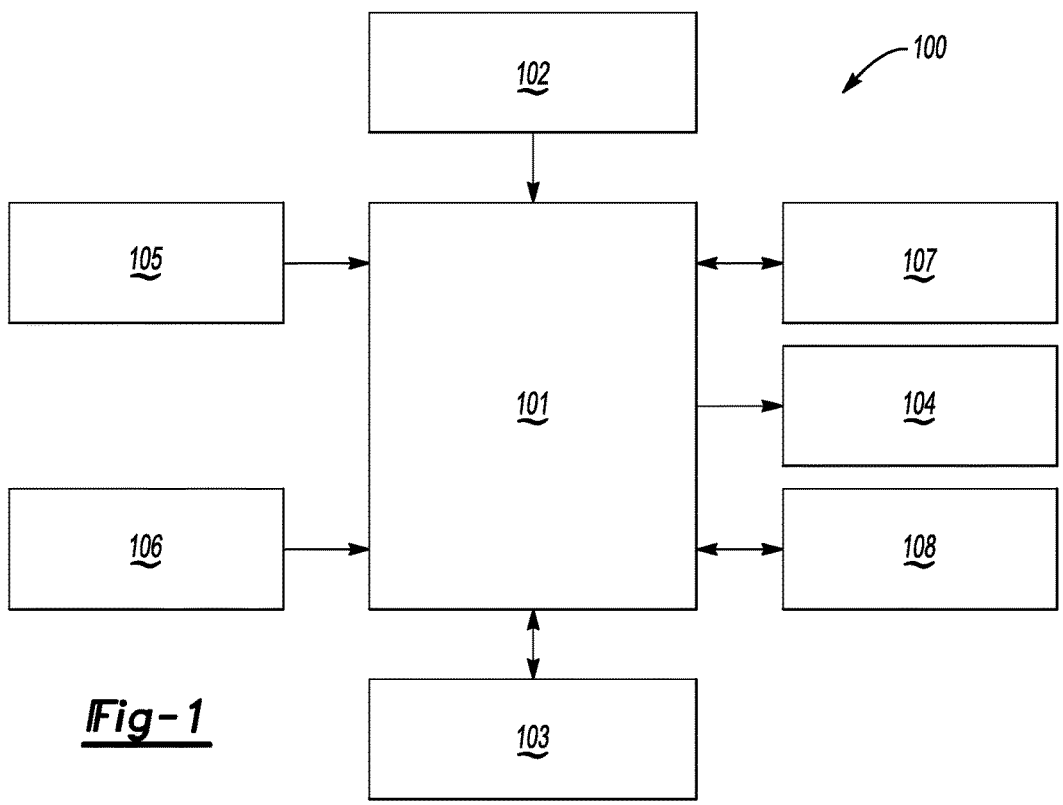
FIG. 1 shows a block diagram of an apparatus for determining whether a shift in gear is appropriate based on a gaze of a user according to an exemplary embodiment.

A method and apparatus for determining whether a shift in gear is intended, unintended, appropriate or inappropriate based on a gaze of a user thereof will now be described in detail with reference to FIGS. 1-3 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "formed on," or "disposed on" a second element, the first element may be connected directly to, formed directly on or disposed directly on the second element or there may be intervening elements between the first element and the second element, unless it is stated that a first element is "directly" connected to, formed on, or disposed on the second element. In addition, if a first element is configured to "receive" information from a second element, the first element may receive the information directly from the second element, receive the information via a bus, receive the information via a network, or receive the information via intermediate elements, unless the first element is indicated to receive information "directly" from the second element.

Throughout the disclosure, one or more of the elements disclosed may be combined into a single device or combined into one or more devices. In addition, individual elements may be provided on separate devices.

Vehicles such as trucks may include gear shifting devices that an operator may move or control to change a gear of the vehicle. Examples of gear shifting devices or gear shifters may include rotary dials, manual levers, gearshift knobs, etc. The gear-shifting device may have various settings, for example, park, reverse, neutral, drive, low gear drive, high gear drive, etc. As new gear shifting devices are implemented in vehicles, there is an issue that an operator of a vehicle that is unfamiliar with a specific gear-shifting device and its corresponding settings may inadvertently or unintentionally select the wrong gear or setting.

One way of addressing the issue of inadvertent or incorrect gear selection is to determine an operator's intent based on context information. The context information may include a gaze of an operator before, during, and after changing a setting or a gear of a vehicle using a gear-shifting device. By analyzing the gaze of an operator, functions may be performed to determine an incorrect gear selection, inform an operator of the incorrect gear selection, and control the vehicle in such a manner to prevent the vehicle from moving in a manner or direction that is inappropriate by the operator of the vehicle.

FIG. 1 shows a block diagram of an apparatus that determines whether a shift in gear is appropriate based on a gaze of an operator 100 (i.e., an apparatus that detects an inappropriate gear selection 100) according to an exemplary embodiment. As shown in FIG. 1, the apparatus that detects an inappropriate gear selection 100, according to an exemplary embodiment, includes a controller 101, a power supply 102, a storage 103, an output 104, a gaze detection sensor 105, a user input 106, a gear shifter 107, and a communication device 108. However, the apparatus that detects an inappropriate gear selection 100 is not limited to the aforementioned configuration and may be configured to include additional elements and/or or omit one or more of the aforementioned elements.

The controller 101 controls the overall operation and function of the apparatus that detects an inappropriate gear selection 100. The controller 101 may control one or more of the storage 103, the output 104, the gaze detection sensor 105, the user input 106, the gear shifter 107, and the communication device 108 of the apparatus that detects an inappropriate gear selection 100. The controller 101 may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components.

The power supply 102 provides power to one or more of the storage 103, the output 104, the gaze detection sensor 105, the user input 106, the gear shifter 107, and the communication device 108 of the apparatus that detects an inappropriate gear selection 100. The power supply 102 may include one or more from a battery, an outlet, a capacitor, a solar energy cell, a generator, a wind energy device, an alternator, etc.

The storage 103 is configured to store information and for retrieving information used by the apparatus that detects an inappropriate gear selection 100. The storage 103 may be controlled by the controller 101 to store and retrieve vehicle context information, gaze information, gear shifter information, etc. The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The gaze information may include one or more from among an action of the user, visual information location, target name, gaze location, dwell time on target, number of distinct glances and total dwell time. The gaze information may indicate whether the user is looking towards a front windshield, the user is looking down or looking at a user device, or the user is looking towards a rear of a vehicle, a rear camera display, a rear view mirror, or a side view mirror.

The vehicle context information may include information about a status of a vehicle control, vehicle component, vehicle power state, etc. The vehicle context information may be provided by sensors or devices such as one or more from among a Global Positioning System (GPS) device, a speedometer, an odometer, an engine sensor, an emission sensor, a transmission sensor, a tire pressure sensor, a door sensor, a trunk sensor, a window sensor, an interior/exterior temperature sensor, a barometric pressure sensor, an acceleration sensor, a gyroscopic sensor, a touch force or pressure sensor, a seat sensor, a passenger sensor, a collision sensor, an external object detector, an ultrasonic sensor, a radar sensor, a thermometer, an altimeter, an electronic control unit (e.g., an electronic controller, etc.), a car light activation sensor, an ambient light sensor, a car key sensor, a car information and entertainment device (i.e., an infotainment device), a communication device, etc.

The vehicle context information may include information on one or more from among an event associated with a vehicle, steering of a vehicle, turn indicator status, a speed of a vehicle, a location of a vehicle, an engine event or status, emission status, revolutions per minute of an engine, transmission status, tire pressure, door open/close status, trunk open/close status, window open/close status, interior/exterior temperature, barometric pressure, altitude of a vehicle, acceleration of a vehicle, user input, user applied pressure to an object or button in a vehicle, whether a passenger is in a seat, location and speed of external objects around the vehicle, which lights of a vehicle are activated, whether a car key is present in a vehicle, a currently displayed screen on a display in a vehicle, daytime or night time status, an amount of ambient light, a status of a vehicle, a status of a setting of a vehicle, and a location of a function that is executable by the user.

The gear shifter information may include information indicating a status of the gear shifter 107 including a current gear, a previous gear, etc. Examples of the status of the gear shifter may include park, reverse, neutral, drive, drive low, drive high, and/or other gear status.

An action of a user may be any identifiable physical interaction that a user has with a system in which a method for determining the intent of the user is performed. For example, an action of the user may be a button press or a position of an operators hands, e.g., whether hands are placed on or removed from the steering wheel.

The target name may be an interface name or a name of a location in a vehicle interior where users may look. For example, a windshield, a center console, or a door may be target names as they may be used to classify areas of vehicle interior. The same location may be given multiple target names, all of which may be stored in storage. For example, the area containing the fuel gauge may by simultaneous described as "Fuel Gauge," "Gauge Cluster," "Instrument Panel," and "Away From Windscreen." The target names may vary depending on the vehicle or system where the method for determining the intent of the user is performed. As such, the target name may also include information identifying a type of vehicle that includes the target.

The gaze location may be the location where the user is looking. The dwell time on target may be the amount of time that a user spends looking at a given location/target before looking at something else. The number of distinct glances may be the number of times the user looks at an area after looking at another area. The total dwell time may be the sum of the dwell times for the number of distinct glances at a given area.

Visual information location may be a physical location in a three dimensional (3D) space around a user in which visual information is presented. For example, a gauge cluster may be located forward and below the eyes of the user and its location may be specified as being a given distance (x, y, and z) from the eyes of the user or other fixed point of reference.

The output 104 outputs information in a visual, audible or haptic form or outputs a signal to cause another device to output information in the aforementioned forms. The output 104 may be controlled by the controller 101 to provide outputs to the user of the apparatus that detects an inappropriate gear selection 100. The output 104 may include one or more from among a speaker, a display, a heads up display, haptic feedback device, a vibration device, a tap-feedback device, a holographic display, etc.

The output 104 may notify the user of the inappropriate shift to the second gear or an inappropriate second gear in response to determining that the second gear is inappropriate. The output 104 may also output a signal to apply a brake in response to determining that the second gear is inappropriate, to disregard the shift from the first gear to the second gear in response to determining that the second gear is inappropriate, or to shift the vehicle into the third gear in response to determining that the third gear is intended or the third gear is appropriate based on the gaze information.

According to one example, the output 104 may output commands to shift into another gear that is more appropriate than the gear that has been selected or apply the brake. The other gear may be determined by the controller 101 based on information from vehicle sensors. For example, assume the vehicle is in (D)rive and an operator uses the shifter to select (R)everse. In this example, if the controller 101 determines that the driver is looking straight ahead (rather than backwards, in the mirror, or in the rear camera display), the controller 101 may control to output 104 to output a signal to shift the vehicle to (N)eutral. In this case, the shifter indicates a command to move backward, but the gaze information indicates the operator wants to move forward. Thus, not moving by placing the vehicle in (N)eutral or (P)ark, or applying the brakes is more appropriate.

The gaze detection sensor 105 is configured to detect a location of a gaze of the user and a direction of movement of the gaze of the user and provide information on the location and the direction to the apparatus that detects an inappropriate gear selection 100 and the controller 101. The gaze detection sensor 105 may include one or more from among an infrared camera, a camera, a near infrared camera, an active light camera, an ultrasonic sensor, a radar device, etc. The gaze detection sensor 105 may provide the information to the controller 101 to be processed so that the controller 101 may perform functions based on one or more of the location of a gaze of the user, the location of the user, and the direction of movement of the gaze of the user.

The user input 106 is configured to provide inputs information and commands to the apparatus that detects an inappropriate gear selection 100. The user input 106 may be used to provide user inputs, etc. to the controller 101. The user input 106 may include one or more from among a touchscreen, a keyboard, a soft keypad, a button, a motion detector, a voice input detector, a microphone, a camera, a trackpad, a mouse, a touchpad, etc.

The gear shifter 107 is configured to receive an operator input to change a gear of the vehicle. The gear shifter 107 may receive a signal to disregard a change of gears form the controller 101. In addition, the gear shifter 107 may receive a signal from the controller 101 to change from a current gear to a gear intended by an operator of the vehicle or a gear that is appropriate based on the circumstances such as the gaze information and other vehicle sensor information.

The communication device 108 may be used by apparatus that detects an inappropriate gear selection 100 to communicate with various types of external apparatuses according to various communication methods. The communication device 108 may be used to provide gaze information, vehicle context information, gear shifter information, etc., to the controller 101 and the apparatus that detects an inappropriate gear selection 100.

The communication device 108 may include various communication modules such as a broadcast receiving module, a near field communication (NFC) module, a GPS module, and a wireless communication module. The broadcast receiving module may include a terrestrial broadcast receiving module including an antenna to receive a terrestrial broadcast signal, a demodulator, and an equalizer, and a digital multimedia broadcasting (DMB) module to receive and process a DMB broadcast signal. The NFC module is a module that communicates with an external apparatus located at a nearby distance according to an NFC method. The GPS module is a module that receives a GPS signal from a GPS satellite and detects a current location. The wireless communication module is a module that is connected to an external network by using a wireless communication protocol such as Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, or ZigBee.

According to an exemplary embodiment, the controller 101 of the apparatus that detects an inappropriate gear selection 100 is configured to detect a shift from a first gear to engage a second gear, receive gaze information associated with the gaze of the user, determine whether the second gear is inappropriate based on the gaze information, and control to perform a corrective action corresponding to the inappropriate second gear in response to determining that the second gear is inappropriate.

The controller 101 may be configured to determine that the second gear is inappropriate if the second gear is a gear in which a wheel of a vehicle moves forward and gaze information includes information indicating that the user is looking towards a rear of a vehicle, a rear camera display, a rear view mirror, or a side view mirror, and to control to apply a brake in response to determining that the second gear is inappropriate.

The controller 101 may be configured to determine that the second gear is inappropriate if the second gear is a gear which causes a vehicle to move and the gaze information include information indicating that the user is looking down or at a user device, and to control disregard the shift from the first gear to the second gear in response to determining that the second gear is inappropriate.

The controller 101 may be configured to determine that the second gear is inappropriate if the second gear is a gear which causes a vehicle to move backwards and the gaze information includes information indicating that the user is looking towards a front windshield, and to control to apply a brake in response to determining that the second gear is inappropriate.

The controller 101 may be configured to determine whether a third gear different from the second gear is intended or appropriate based on the gaze information and shift the vehicle into the third gear in response to determining to shift into the third gear based on the gaze information.

The controller 101 may be configured to perform a corrective action corresponding to the inappropriate second gear by notifying the user that the second gear may be inappropriate. The controller 101 may notify the user by controlling to output at least one from among audible feedback, displayed feedback and haptic feedback to the user.

Figure 2:
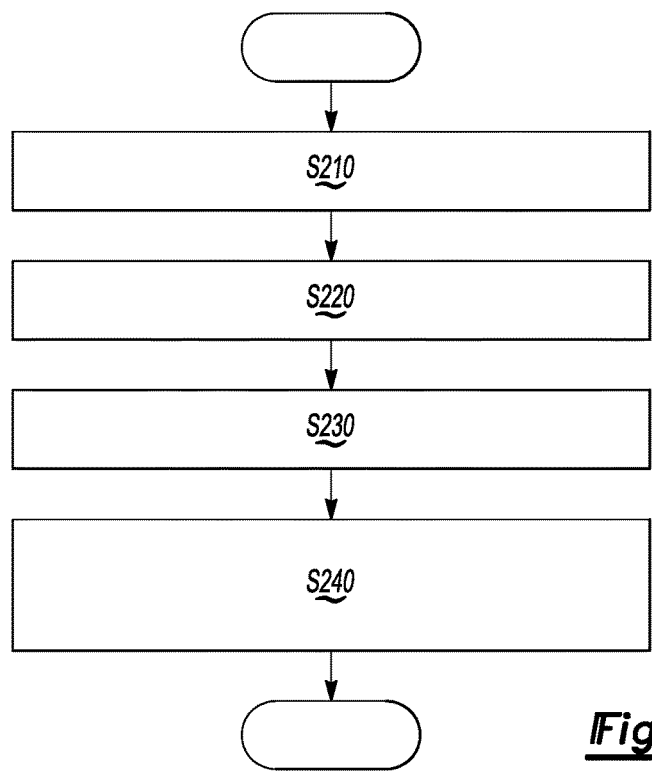
FIG. 2 shows a flowchart for a method of determining whether a shift in gear is appropriate based on a gaze of a user according to an exemplary embodiment.

FIG. 2 shows a flowchart for a method of determining whether a shift in gear is appropriate based on a gaze of a user according to an exemplary embodiment. The method of FIG. 2 may be performed by the apparatus that detects an inappropriate gear selection 100 or may encoded into a computer readable medium as instructions that are executable by a computer to perform the method.

Referring to FIG. 2, gaze information associated with the gaze of the user or operator is received in operation S210. The gaze information may be analyzed to determine where an operator is looking or the intent of the operator. In operation S220, a shift from a first gear to engage a second gear is detected. This shift is detected at the gear shifter and may be a shift from park to reverse, reverse to drive, drive or reverse to park, etc.

After the shift is detected, it is determined whether the second gear is inappropriate based on the gaze information in operation S230. For example, the gaze information may indicate that the operator or user is looking forward and the second gear may be a reverse gear, and vice versa. In operation S240, a corrective action corresponding to the inappropriate second gear may be performed and/or an operator or user may be notified of the inappropriate shift to the second gear in response to determining the gear is inappropriate.

Figure 3:
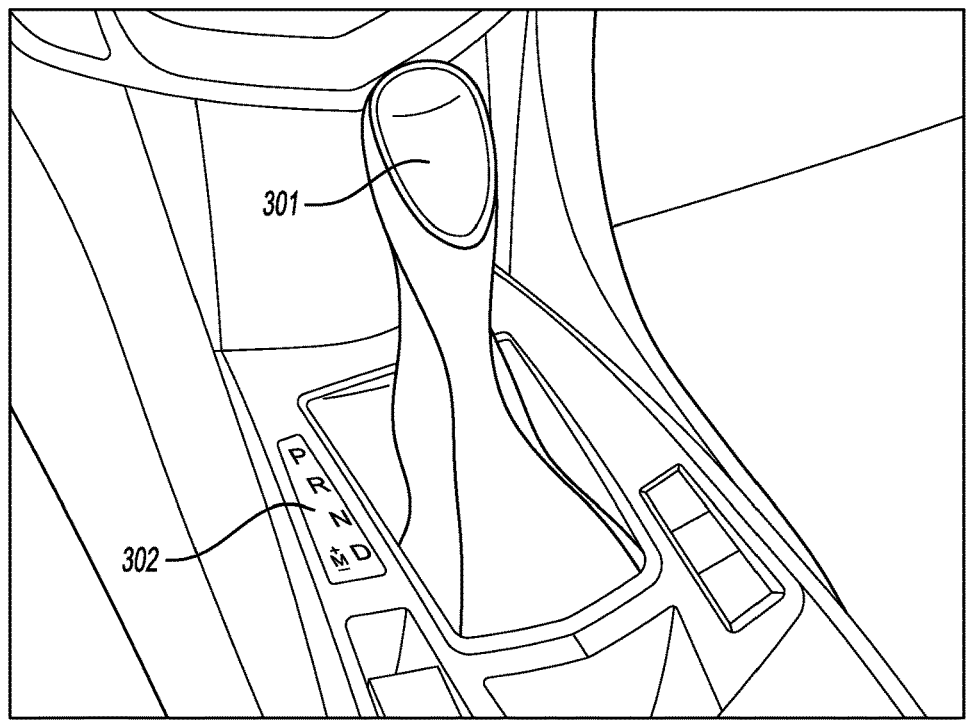
FIG. 3 shows examples illustrations of gear shifters according to an aspect of an exemplary embodiment.
Figure 3:
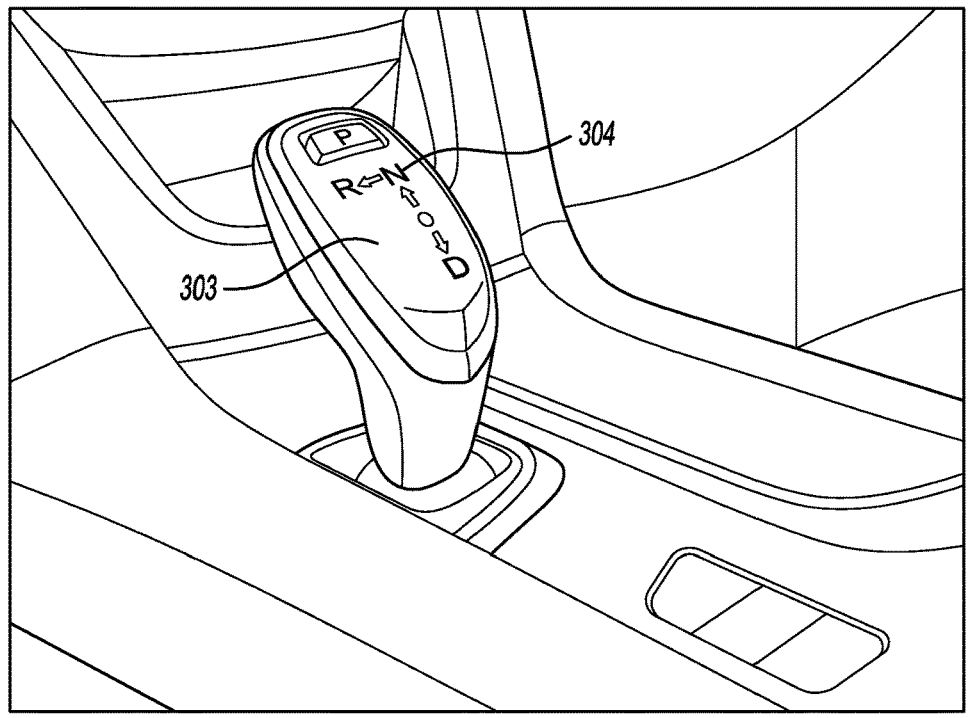

FIG. 3 shows examples illustrations of gear shifters according to an aspect of an exemplary embodiment. Referring to FIG. 3, shifter 301 shows an example of a mechanical shifter that separate physical positions for the different gear settings 302. The gear settings 302 on shifter 301 may include (P)ark, (R)everse, (N)eutral, and (D)rive. However, an operator moving the shifter 301 to a position of the P setting may accidentally leave it at the R setting. Thus, the apparatus that detects an inappropriate gear selection based on a gaze of a user 101 may perform a corrective action corresponding to the inappropriate second gear by notifying the operator or user that the shifter is in R and that the user intended to place the vehicle in P.

Shifter 303 shows an example of electronic gear shifter. The gear settings 304 on shifter 303 may include (P)ark, (R)everse, (N)eutral, and (D)rive. The shifter 303 operates by electronically changing the gear of the vehicle in response to a shifter being temporarily displaced. However, after the shifter is displaced, it returns to its original position. Thus, an operator may have intended to displace the shifter 303 to gear setting 304 of drive, but may not displaced it in the right direction or may not displace it the requisite number of times to change the electronic gear setting. Therefore, the apparatus that detects an inappropriate gear selection based on a gaze of a user 101 may perform a corrective action corresponding to the inappropriate second gear by notifying the operator or user that the shifter is in R and that the user intended to place the vehicle in P.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method of detecting an inappropriate gear selection based on a gaze of a user, the method comprising:
   detecting a shift from a first gear to engage a second gear;
   receiving gaze information associated with the gaze of the user;
   based on the gaze information, determining whether the second gear is inappropriate;
   performing a corrective action corresponding to the inappropriate second gear in response to determining that the second gear is inappropriate;
   determining whether to shift to a third gear different from the second gear based on the gaze information; and
   shifting the vehicle into the third gear in response to determining to shift into the third gear based on the gaze information.

2. The method of claim 1, wherein the gaze information comprises information indicating that the user is looking towards a rear of a vehicle, a rear camera display, a rear view mirror, or a side view mirror,
   wherein the determining determines that the second gear is inappropriate if the second gear is a gear in which a wheel of a vehicle moves forward.

3. The method of claim 2, further comprising applying a brake in response to determining that the second gear is inappropriate.

4. The method of claim 1, wherein the gaze information comprises information indicating that the user is looking down or at a user device,
   wherein the determining determines that the second gear is inappropriate if the second gear is a gear which causes a vehicle to move.

5. The method of claim 4, further comprising disregarding the shift from the first gear to the second gear in response to determining that the second gear is inappropriate.

6. The method of claim 1, wherein the gaze information comprises information indicating that the user is looking towards a front windshield,
   wherein the determining determines that the second gear is inappropriate if the second gear is a gear which causes a vehicle to move backwards.

7. The method of claim 6, further comprising applying a brake in response to determining that the second gear is inappropriate.

8. The method of claim 1, wherein the performing the corrective action corresponding to the inappropriate second gear comprises notifying the user that the second gear may be inappropriate by outputting at least one from among audible feedback, displayed feedback, and haptic feedback to the user.

9. A non-transitory computer readable medium comprising instructions executable by a computer to perform the method of claim 1.

10. An apparatus for detecting an inappropriate gear selection based on a gaze of a user, the apparatus comprising:
    at least one memory comprising computer executable instructions; and
    at least one processor configured to read and execute the computer executable instructions, the computer executable instructions causing the at least one processor to:
    detect a shift from a first gear to engage a second gear;
    receive gaze information associated with the gaze of the user;
    determine whether to shift into a third gear different from the second gear based on the gaze information; and
    shift the vehicle into the third gear in response to determining to shift into the third gear based on the gaze information.

11. The apparatus of claim 10, wherein the gaze information comprises information indicating that the user is looking towards a rear of a vehicle, a rear camera display, a rear view mirror, or a side view mirror, and
    wherein the computer executable instructions further cause the at least one processor to determine that the second gear is inappropriate if the second gear is a gear in which a wheel of a vehicle moves forward.

12. The apparatus of claim 11, wherein the computer executable instructions further cause the at least one processor to control to apply a brake in response to determining that the second gear is inappropriate.

13. The apparatus of claim 10, wherein the gaze information comprises information indicating that the user is looking down or at a user device,
    wherein the computer executable instructions further cause the at least one processor to determine that the second gear is inappropriate if the second gear is a gear which causes a vehicle to move.

14. The apparatus of claim 13, wherein the computer executable instructions further cause the at least one processor to control to disregard the shift from the first gear to the second gear in response to determining that the second gear is inappropriate.

15. The apparatus of claim 10, wherein the gaze information comprises information indicating that the user is looking towards a front windshield, and
    wherein the computer executable instructions further cause the at least one processor to determine that the second gear is inappropriate if the second gear is a gear which causes a vehicle to move backwards.

16. The apparatus of claim 15, wherein the computer executable instructions further cause the at least one processor to control to apply a brake in response to determining that the second gear is inappropriate.

17. The apparatus of claim 10, wherein the computer executable instructions further cause the at least one processor to perform the corrective action corresponding to the inappropriate second gear by notifying the user that the second gear may be inappropriate by outputting at least one from among audible feedback displayed feedback and haptic feedback to the user.

18. The apparatus of claim 10, wherein the gaze information comprises at least one from among an action of the user, visual information location, target name, gaze location, dwell time on target, number of distinct glances and total dwell time.

* * * * *